United States Patent
Zhang et al.

(10) Patent No.: US 6,952,518 B2
(45) Date of Patent: Oct. 4, 2005

(54) DISPERSION-SHIFTED SINGLE-MODE FIBER HAVING LOW DISPERSION SLOPE FOR LARGE CAPACITY TRANSMISSION

(75) Inventors: Shuqiang Zhang, Wuhan (CN); Qingrong Han, Wuhan (CN); Yuqing Cao, Wuhan (CN); TieJun Wang, Wuhan (CN); Raadj Matai, Wuhan (CN); Jie Luo, Wuhan (CN)

(73) Assignee: Yangtze Optical Fibre and Cable Co. Ltd., Wuhan (CN)

(*) Notice: Subject to any disclaimer, the term of this patent is extended or adjusted under 35 U.S.C. 154(b) by 0 days.

(21) Appl. No.: 10/757,210

(22) Filed: Jan. 14, 2004

(65) Prior Publication Data

US 2004/0146261 A1  Jul. 29, 2004

(30) Foreign Application Priority Data

Jan. 14, 2003  (CN) ......................................... 03118463 A

(51) Int. Cl.$^7$ ................................................ G02B 6/02
(52) U.S. Cl. ................... 385/126; 385/127; 385/123; 385/124; 385/125
(58) Field of Search ................... 385/126, 127, 385/123, 124, 125

(56) References Cited

U.S. PATENT DOCUMENTS 6,396,987 B1    5/2002  de Montmorillon et al.
6,684,016 B2 *  1/2004  Jung et al. ................ 385/123
2003/0077057 A1 * 4/2003  Kato et al. ................ 385/123

FOREIGN PATENT DOCUMENTS

CN    1068434 C    7/2001
CN    1337010 A    2/2002
CN    1348548 A    5/2002

* cited by examiner

Primary Examiner—Frank G. Font
Assistant Examiner—Joanne H. Kim
(74) Attorney, Agent, or Firm—Dorsey & Whitney LLP

(57) ABSTRACT

The invention relates to a low dispersion slope dispersion-shifted single-mode fiber for large capacity transmission comprising a core and a cladding. Said fiber is characterized in that said core has three to five core segments having different refractive index profiles, and said cladding has four to six cladding segments. The total dispersion slope of said fiber at 1550 nm is less than 0.060 ps/nm$^2$·km, the zero dispersion wavelength is less than 1420 nm, the effective area ranges from 55 $\mu$m$^2$ to 65 $\mu$m$^2$, and the dispersion in the region of 1530 nm~1565 nm ranges from 5.0 ps/nm$^2$·km to 12.0 ps/nm$^2$·km. The fiber has low dispersion slope, moderate dispersion, low attenuation, and excellent bend resistance performance. It is suitable for a high-speed (10 Gbits/s and 40 Gbits/s), large capacity, and long distance DWDM system. Therefore, not only the non-linear problem that fazes high-speed communication is solved effectively, but also the DWDM transmission at 10 Gbits/s can be realized within a wider wavelength range. In addition, low dispersion slope is advantageous for comprehensive management of dispersion, so that the requirement for long distance non-electric relay can be fulfilled.

7 Claims, 3 Drawing Sheets

DISPERSION-SHIFTED SINGLE-MODE FIBER HAVING LOW DISPERSION SLOPE FOR LARGE CAPACITY TRANSMISSION

CROSS-REFERENCE TO RELATED APPLICATIONS

This application claims priority to Chinese Application No. 03118463.4, filed on Jan. 14, 2003, the contents of which is hereby incorporated in its entirety by reference.

BACKGROUND OF THE INVENTION

I. Field of the Invention

The present invention relates to a single-mode fiber designed for large capacity transmission system. The fiber has low dispersion slope, moderate dispersion, low attenuation, and excellent bend resistance performance. It is suitable for a high speed (10 Gbits/s and 40 Gbits/s), large capacity, long distance dense wavelength division multiplex (DWDM) system, and all the S, C, and L bands of the fiber can be used for DWDM transmission.

II. Description of the Related Art

Since the middle of nineties of the twentieth century, along with the developments of the erbium-doped fiber-amplifier (EDFA) and wavelength division multiplex (WDM) technology, the fiber communication enters its unprecedented high-speed developing stage. The capacity of the fiber communication increases doubly every year. Today, the bit rate of the commercial transmission system reaches 10 Gbits/s, and the capacity reached 1.6 T. When the transmission rate exceeds 2.5 Gbits/s, and because of the practicability of the EDFA, dispersion, instead of attenuation, becomes the main limited factor of long distance transmission. Along with the development of the WDM technology, the influence on the system from the non-linear effects (for example, four-wave mixing, self-phase modulation, cross phase modulation, etc.) among the respective wavelengths limits the augment of the system capacity. In order to restrain the influence of the non-linearity in the DWDM system, a proper amount of dispersion is necessary in its transmission band. Therefore, the development of fiber technology transfers from zero dispersion-shifted fiber to non-zero dispersion-shifted fiber. A number of methods for designing and producing such fiber have been disclosed, for example, a non-zero dispersion-shifted fiber having larger effective area and method for producing the same has disclosed in Chinese Patent 98121639.0, such fiber has been widely used in the construction of communication backbone network. The further growth of transmission capacity impels the consideration of sufficiently making use of bandwidth resource of fiber. The range of utilizing amplifier has extended from C-band to L-band. At the same time the breakthrough in researching new amplifiers that can be used in wider wavelength range has been realized. It has been reported that the product of gain and bandwidth of Raman fiber amplifier (RFA) reaches 132 nm now, and a gain of 30 dB in the range of 1480 nm~1620 nm can be obtained. The C-band and L-band RFA modules that can be used in 40 Gbits/s system are available commercially. However, the zero dispersion point of the current non-zero dispersion-shifted fiber is within S-band, so that S-band cannot be used for DWDM transmission. In addition, the dispersion slope in C-band and L-band is somewhat great, and its value exceeds 0.08 ps/nm²·km. Thus, when making management of dispersion using dispersion compensation technique, except in central wavelength region, the complete compensation cannot be obtained in side band regions. The wider wavelength region for transmission shall result in higher residual dispersion in the side band region. This problem does not affect greatly a system which transmission rate is less than 10 Gbits/s, however, for a 40 Gbits/s high-speed transmission system that requires precisely managing dispersion, the high dispersion slope becomes a serious problem. Therefore, lowering the dispersion slope of fiber is required, so as to decrease the difference between the dispersions of long wavelength and short wavelength that increases along with the distance, and the bandwidth can be fully utilized. Because the non-linear effect affects a large capacity high-speed transmission system more intensively, properly increasing the dispersion value of fiber is required, so as to restrain the influence from the non-linear effect. In the application documents of 00806764.3 in Chinese Patent Publication, there is an embodiment in which a triangular profile that having a central depression is adopted, its dispersion slope decreases to 0.073 ps/nm²·km, but the zero dispersion point is 1499 nm, and not shifted out of S-band, and its dispersion slope is still on the high side. A fiber is disclosed in U.S. Pat. No. 6,396,987B1, its effective area is greater than 60 $\mu m^2$, its dispersion slope is less than 0.07 ps/nm²·km, its dispersion at 1550 nm ranges from 7 ps/nm·km to 9 ps/nm·km, its zero dispersion point is within 1400 nm~1440 nm, its cutoff wavelength exceeds 1600 nm, and its attenuation at 1550 nm is less than or equals to 0.23 dB/km. In said U.S. Patent, the refractive index profiles of the core segments are trapezoidal-index profile and step-index profile having central depression. A step-index profile is also given in the application documents of 00802639.4 in Chinese Patent Publication, its dispersion at 1550 nm ranges from 7 ps/nm·km to 15 ps/nm·km, and its dispersion slope is less than 0.07 ps/nm²·km.

However, because the fiber section has a fewer number of segments, its structure is rather simple, and the parameters for controlling the refractive index profiles of the core segments are relatively fewer, so that to precisely control the parameters of fiber is difficult. Therefore, to equilibrate and control the dispersion, dispersion slope, effective area, and attenuation performances is difficult. This situation becomes more prominent in the mass production.

Definitions and Explanations:

Relative refractive index difference $\Delta\% = [(n_i^2 - n_c^2)/2n_i^2] \times 100$ in which $n_i$ is the refractive index of the $i^{th}$ layer, and $n_c$ is the refractive index of the pure silica glass portion of the cladding, it is the reference refractive index in the invention.

Refractive index profile is defined as the relation of the relative refractive index difference $\Delta\%$ or relative refractive index of a selected portion versus its radius.

Total dispersion is defined as the algebraic sum of waveguide dispersion and material dispersion of the fiber. In the optical fiber communication field, the total dispersion is chromatic dispersion of fiber. Its unit is ps/nm·km Dispersion slope represents the dependence of dispersion on wavelength, it is a slope of such a curve that the wavelength is taken as its abscissa, and the dispersion value is taken as its ordinate. Its unit is ps/nm²·km. In a WDM system, if the transmission path has large dispersion slope, then the difference of dispersion value between wavelengths increases, and the transmission performance is deteriorated as a whole.

Effective area is defined as:

$$A_{eff} = 2\pi (\int E^2 r\, dr)^2 / (\int E^4 r\, dr)$$

in which the limit of integration is from 0 to ∞, and E is electric field that relates to propagation.

DWDM is the abbreviation of dense wavelength division multiplex.

The bend resistance performance of fiber refers to as the additional attenuation under specified test condition. The standard test condition includes winding 100 turns on a reel having a diameter of 75 mm and winding one turn on a reel having a diameter of 32 mm. The process is as follows: first testing attenuation of fiber under normal test condition; then winding the fiber on a reel and testing its attenuation according to the standard; the difference of these two tested attenuation values is the bend induced additional attention. Generally, the allowable maximum bend induced attenuation takes the bend induced additional attenuation at 1310 nm as the standard, the unit of the bend induced additional attenuation under each test condition is dB. In the present application the method for testing bend induces additional attenuation is more rigorous, i.e., testing the additional attenuations at 1550 nm and 1625 nm under the conditions of winding 100 turns on Φ 60 mm reel and winding one turn on 32 mm reel, and taking the maximum value as the final measured result.

SUMMARY OF THE INVENTION

The technical problem to be settled by the invention is to provide a non-zero dispersion-shifted single-mode fiber suitable for high speed, large capacity transmission system. Said fiber equilibrates the following key performances for transmission over fiber: dispersion, dispersion slope, effective area, and attenuation performance. Therefore, not only the non-linear problem that fazes high-speed communication is solved effectively, but also the DWDM transmission above 10 Gbits/s can be realized within a wider wavelength range. In addition, low dispersion slope is advantageous for comprehensive management of dispersion, so that the requirement for long distance non-electric relay can be fulfilled.

The technical solution for the aforesaid technical problem is as follows: the fiber comprising a core and a cladding is characterized in that said core has three to five core segments having different refractive index profiles, said cladding has four to six cladding segments. The total dispersion slope of said fiber at 1550 nm is less than 0.060 ps/nm$^2$·km, the zero dispersion wavelength is less than 1420 nm, the effective area ranges from 55 $\mu m^2$ to 65 $\mu m^2$, the dispersion in the region of 1530 nm~1565 nm ranges from 5.0 ps/nm$^2$·km to 12.0 ps/nm$^2$·km.

In accordance with the aforesaid technical solution, tipically, said core has three core segments having different refractive index profiles, and said cladding has four cladding segments. The relative refractive index difference ΔCore1% of the first core segment of said core ranges from 0.35% to 0.9%, the diameter ΦCore1 ranges approximately from 2.0 $\mu$m to 7.0 $\mu$m. The relative refractive index difference ΔCore2% of the second core segment Core2 ranges approximately from 0.25% to 0.65%, and the diameter ΦCore2 ranges approximately from 3.0 $\mu$m to 8.0 $\mu$m. The relative refractive index difference ΔCore3% of the third core segment Core3 ranges approximately from 0.1% to 0.4%, and the diameter ΦCore3 ranges approximately from 4.0 $\mu$m to 10.0 $\mu$m. The relative refractive index difference ΔClad1% of the first cladding segment Clad1 ranges approximately from −0.2% to 0.1%, and the diameter ΦClad1 ranges approximately from 8.0 $\mu$m to 16.0 $\mu$m. The relative refractive index difference ΔClad2% of the second cladding segment Clad2 ranges approximately from 0.1% to 0.4%, and the diameter ΦClad2 ranges approximately from 12.0 $\mu$m to 25.0 $\mu$m. The relative refractive index difference ΔClad3% of the third cladding segment Clad3 ranges approximately from −0.2% to 0.2%, and the diameter ΦClad3 ranges approximately from 19.0 $\mu$m to 30.0 $\mu$m. The fourth cladding segment is a layer of pure silica glass, and its refractive index is the refractive index of the pure silica glass $n_c$.

As regards the preferable waveguide structure of the fiber of the invention, both the relative refractive index difference ΔClad1% of the first cladding segment Clad1 and the relative refractive index difference ΔClad3% of the third cladding segment Clad3 are negative, and the ranges of the parameters of the respective core segments and cladding segments are the follows:

| First core segment Core1: | |
|---|---|
| ΔCore1% is about 0.42 ± 0.06 | (0.36~0.48) |
| ΦCore1 is about 4.6 ± 0.7 $\mu$m | (3.9~5.3 $\mu$m) |
| Second core segment Core2: | |
| ΔCore2% is about 0.35 ± 0.08 | (0.27~0.43) |
| ΦCore2 is about 6.0 ± 1.0 $\mu$m | (5.0~7.0 $\mu$m) |
| Third core segment Core3: | |
| ΔCore3% is about 0.28 ± 0.1 | (0.18~0.38) |
| ΦCore3 is about 7.1 ± 1.5 $\mu$m | (5.6~8.6 $\mu$m) |
| First cladding segment Clad1: | |
| ΔClad1% is about −0.08 ± 0.07 | (−0.01~−0.15) |
| ΦClad1 is about 12.5 ± 2.0 $\mu$m | (10.5~14.5 $\mu$m) |
| Second cladding segment Clad2: | |
| ΔClad2% is about 0.18 ± 0.07 | (0.11~0.25) |
| ΦClad2 is about 18.1 ± 2.0 $\mu$m | (16.1~20.1 $\mu$m) |
| Third cladding segment Clad3: | |
| ΔClad3% is about −0.08 ± 0.07 | (−0.01~−0.15) |
| ΦClad3 is about 27.0 ± 2.5 $\mu$m | (24.5~29.5 $\mu$m) |

Fourth cladding segment is a layer of pure silica glass, and its refractive index is the refractive index of the pure silica glass $n_c$.

The advantageous effects of the invention are, as compared with the former structure, more waveguide structural parameters of the fiber, for example, ΔCore1%, ΦCore1, ΔCore2%, ΦCore2, ΔCore3%, ΦCore3, and the value of power α that determines the refractive index profile of Core1, can be adjusted. Therefore the design of multiple core segments has the capability of controlling the performances of the fiber more precisely, and the dispersion, dispersion slope, effective area, and attenuation performances of the fiber can be equilibrated easily.

By adjusting the refractive index profile of the fiber, the required values of dispersion, dispersion slope and larger effective area can be obtained, and said fiber possesses lower attenuation and excellent bending performance. According to the invention, the total dispersion of the fiber at 1550 nm is less than 0.060 ps/nm$^2$·km, the zero-dispersion wavelength is less than 1420 nm, the effective area ranges from 55 $\mu m^2$ to 65 $\mu m^2$, the dispersion in the range of 1530 nm~1565 nm is 5.0~12.0 ps/nm$^2$·km, the attenuation at 1550 nm is less than or equals to 0.22 dB/km. According to the method of bend resistance performance test, under the test condition of winding 100 turns on Φ 60 mm reel, the additional attenuation induced by bending is less than 0.05 dB at both 1550 nm and 1625 nm, under the test condition of winding 1 turn on Φ 32 mm reel, the additional attenuation induced by bending is less than 0.5 dB at both 1550 nm and 1625 nm. The attenuation in the whole 1530 nm~1565 nm band is less than or equals to 0.23 dB/km. This is the optimal transmission window at the present time, for is corresponds to the range in which the gain of EDFA is flat, and high bit rate DWDM transmission may be carried out through it. In particular, because a depression structure is adopted in ΔClad3%, the cutoff wavelength is lowered and less than 1310 nm, so that single mode transmission through 1310 nm window may be performed simultaneously over the wide band non zero dispersion-shifted fiber of the invention.

The invention adopts more complex refraction index profile to realize the equilibrium among dispersion, dispersion slope, effective area and attenuation performances. In addition, in combination with the capability of precisely controlling the refractive index profile that is peculiar to PCVD process, the designed performance can be realized with high efficiency.

DETAILED DESCRIPTION OF THE PREFERRED EMBODIMENTS

Figure 1:
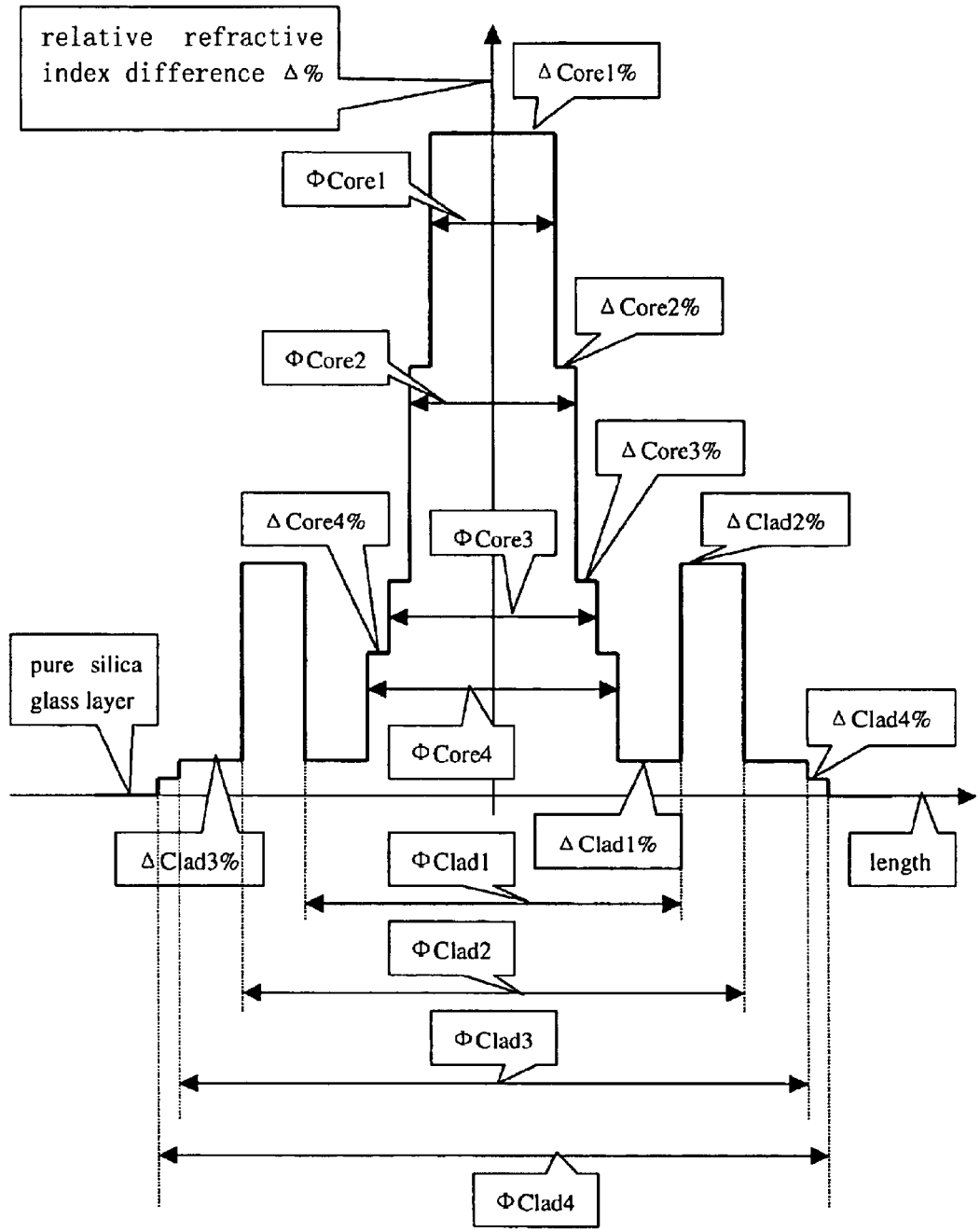
FIG. 1 is a distribution graph showing schematically the relative refractive index difference Δ% profile versus diameter in the first embodiment of the invention.

In accordance with the invention, typically the core comprises three core segments, and the cladding comprises four cladding segments. The relative refractive index difference ΔCore1% of the first core segment Core1 ranges approximately from 0.35% to 0.9%, and the diameter ΦCore1 ranges approximately from 2.0 μm to 7.0 μm. The relative refractive index difference ΔCore2% of the second core segment Core2 ranges approximately from 0.25% to 0.65%, and the diameter ΦCore2 ranges approximately from 3.0 μm to 8.0 μm. The relative refractive index difference ΔCore3% of the third core segment Core3 ranges approximately from 0.1% to 0.4%, and the diameter ΦCore3 ranges approximately from 4.0 μm to 10.0 μm. The relative refractive index difference ΔClad1% of the first cladding segment Clad1 ranges approximately from −0.2% to 0.1%, and the diameter ΦClad1 ranges approximately from 8.0 μm to 16.0 μm. The relative refractive index difference ΔClad2% of the second cladding segment Clad2 ranges approximately from 0.1% to 0.4%, and the diameter ΦClad2 ranges approximately from 12.0 μm to 25.0 μm. The relative refractive index difference ΔClad3% of the third cladding segment Clad3 ranges approximately from −0.2% to 0.2%, and the diameter ΦClad3 ranges approximately from 19.0 μm to 30.0 μm. The fourth cladding segment is a layer of pure silica glass, and its refractive index is the refractive index of the pure silica glass $n_c$.

As regards the preferable waveguide structure of the fiber of the invention, both the relative refractive index difference ΔClad1% of the first cladding segment Clad1 and the relative refractive index difference ΔClad3% of the third cladding segment Clad3 are negative, and the ranges of the parameters of the respective core segments and cladding segments are the follows:

First core segment Core1:

| ΔCore1% is about 0.42 ± 0.06 | (0.36~0.48) |
| ΦCore1 is about 4.6 ± 0.7 μm | (3.9~5.3 μm) |

Second core segment Core2:

| ΔCore2% is about 0.35 ± 0.08 | (0.27~0.43) |
| ΦCore2 is about 6.0 ± 1.0 μm | (5.0~7.0 μm) |

Third core segment Core3:

| ΔCore3% is about 0.28 ± 0.1 | (0.18~0.38) |
| ΦCore3 is about 7.1 ± 1.5 μm | (5.6~8.6 μm) |

First cladding segment Clad1:

| ΔClad1% is about −0.08 ± 0.07 | (−0.01~−0.15) |
| ΦClad1 is about 12.5 ± 2.0 μm | (10.5~14.5 μm) |

Second cladding segment Clad2:

| ΔClad2% is about 0.18 ± 0.07 | (0.11~0.25) |
| ΦClad2 is about 18.1 ± 2.0 μm | (16.1~20.1 μm) |

Third cladding segment Clad3:

| ΔClad3% is about −0.08 ± 0.07 | (−0.01~−0.15) |
| ΦClad3 is about 27.0 ± 2.5 μm | (24.5~29.5 μm) |

Fourth cladding segment is a layer of pure silica glass, and its refractive index is the refractive index of the pure silica glass $n_c$.

As compared with the former structure, more waveguide structural parameters of the fiber, for example, ΔCore1%, ΦCore1, ΔCore2%, ΦCore2, ΔCore3%, ΦCore3, and the value of power α that determines the refractive index profile of Core1, can be adjusted. Therefore the design of multiple core segments has the capability of controlling the performances of the fiber more precisely, and the dispersion, dispersion slope, effective area, and attenuation performances of the fiber can be equilibrated easily.

By adjusting the refractive index profile of the fiber, the required values of dispersion, dispersion slope and larger effective area can be obtained, and said fiber possesses lower attenuation and excellent bending performance. According to the invention, the total dispersion of the fiber at 1550 nm is less than 0.060 ps/nm$^2$·km, the zero-dispersion wavelength is less than 1420 nm, the effective area ranges from 55 μm$^2$ to 65 μm$^2$, the dispersion in the range of 1530 nm~1565 nm is 5.0~12.0 ps/nm$^2$·km, the attenuation at 1550 nm is less than or equals to 0.22 dB/km. According to the method of bend resistance performance test, under the test condition of winding 100 turns on Φ 60 mm reel, the additional attenuation induced by bending is less than 0.05 dB at both 1550 nm and 1625 nm, under the test condition of winding 1 turn on Φ 32 mm reel, the additional attenuation induced by bending is less than 0.5 dB at both 1550 nm and 1625 nm. The attenuation in the whole 1530 nm~1565 nm band is less than or equals to 0.23 dB/km. This is the optimal transmission window at the present time, for is corresponds to the range in which the gain of EDFA is flat, and high bit rate DWDM transmission may be carried out through it. In particular, because a depression structure is adopted in ΔClad3%, the cutoff wavelength is lowered and less than 1310 nm, so that single mode transmission through 1310 nm window may be performed simultaneously over the wide band non zero dispersion-shifted fiber of the invention.

Embodiment 1

The parameter set for relative refractive index difference profiles shown in FIG. 1 are listed as follows:

The parameters of the respective core segments are:

First core segment Core1:

ΔCore1% is about 0.64, ΦCore1 is about 3.0 μm
Second core segment Core2:
ΔCore2% is about 0.42, ΦCore2 is about 4.1 μm
Third core segment Core3:
ΔCore3% is about 0.21, ΦCore3 is about 7.5 μm
Fourth core segment Core4:
ΔCore4% is about 0.15, ΦCore4 is about 9.0 μm
The parameters of the respective cladding segments are:
First cladding segment Clad1:
ΔClad1% is about 0.04, ΦClad1 is about 15.0 μm
Second cladding segment Clad2:
ΔClad2% is about 0.25, ΦClad2 is about 21.0 μm
Third cladding segment Clad3:
ΔClad3% is about 0.04, ΦClad3 is about 27.0 μm
Fourth cladding segment Clad4:
ΔClad4% is about 0.02, ΦClad4 is about 31.0 μm
The outmost cladding segment is a pure silica glass layer.
The performances of the obtained fiber are the follows:
Effective area at 1550 nm: 56 μm$^2$,
Zero dispersion wavelength: 1415 nm,
Dispersion at 1550 nm: 7.4 ps/nm·km,
Dispersion slope at 1550 nm: 0.054 ps/nm$^2$·km,
Cutoff wavelength: 1530 nm,
Attenuation at 1550 nm: 0.20 dB/km,
Maximum additional attenuation induced at 1550 nm and 1625 nm from macro bending for 100 turns on Φ 60 mm reel: 0.001 dB,
Maximum additional attenuation induced from bending at 1550 nm and 1625 nm from macro bending for 1 turn on Φ 32 mm reel: 0.002 dB.

The dispersion slope of the fiber in Embodiment 1 is less than 0.055 ps/nm$^2$·km at 1550 nm, its zero-dispersion wavelength is shifted out of S band, and it has excellent attenuation and bending performance, and its cutoff wavelength is lowered 200 to 400 nm after cabling. The requirement of dense wavelength division multiplex in the S+C+L bands can be fulfilled by such an optical fiber.

Embodiment 2

Figure 2:
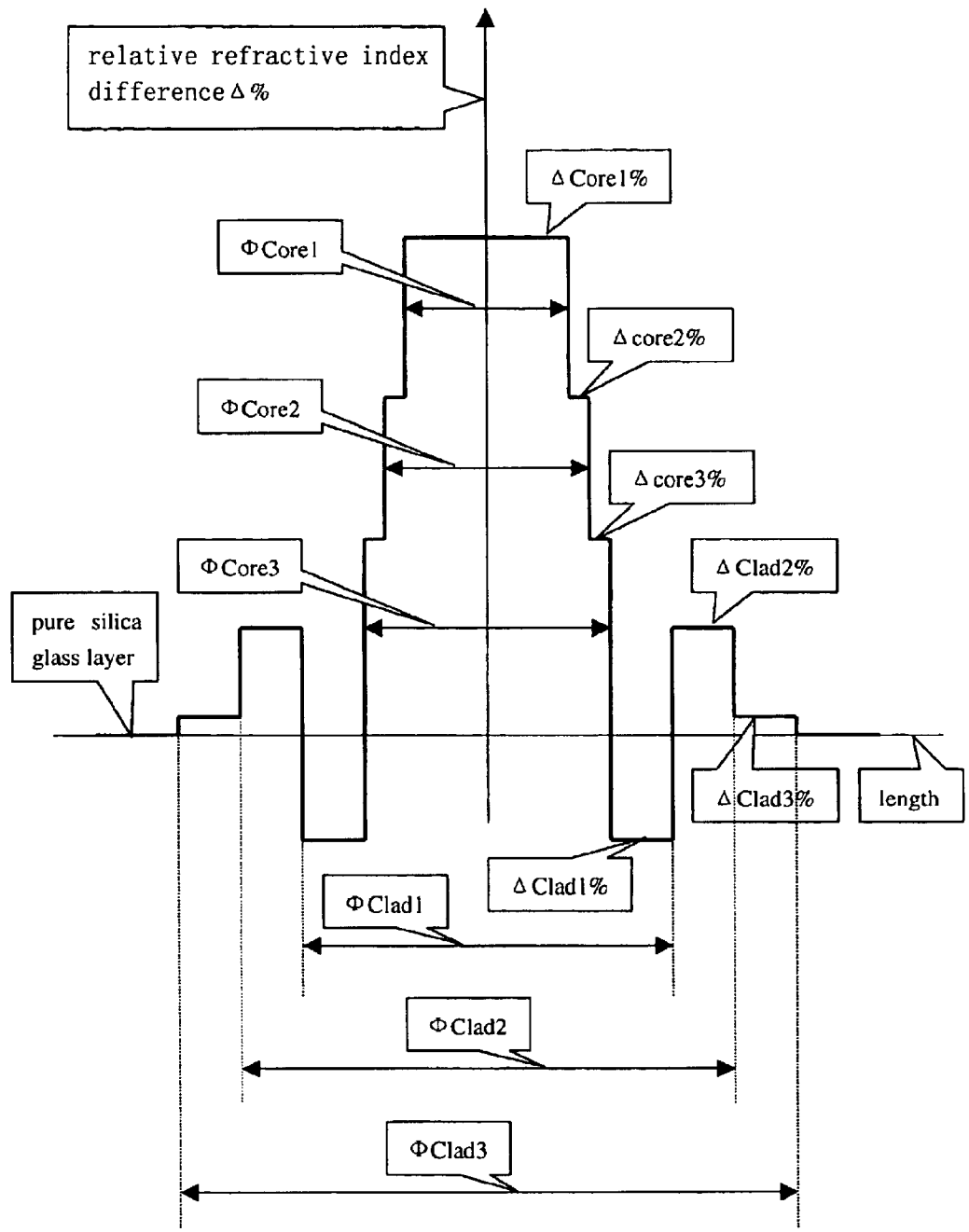
FIG. 2 is a distribution graph showing schematically the relative refractive index difference Δ% profile versus diameter in the second embodiment of the invention.

The parameter set for relative refractive index difference profiles shown in FIG. 2 are listed as follows:
The parameters of the respective core segments are:
First core segment Core1:
ΔCore1% is about 0.42, ΦCore1 is about 4.6 μm
Second core segment Core2:
ΔCore2% is about 0.35, ΦCore2 is about 6.0 μm
Third core segment Core3:
ΔCore3% is about 0.28, ΦCore3 is about 7.1 μm
The parameters of the respective cladding segments are:
First cladding segment Clad1:
ΔClad1% is about −0.10, ΦClad1 is about 11.5 μm
Second cladding segment Clad2:
ΔClad2% is about 0.18, ΦClad2 is about 16.2 μm
Third cladding segment Clad3:
ΔClad3% is about 0.02, ΦClad3 is about 29.0 μm
Fourth cladding segment is a pure silica glass layer.
The performances of the obtained fiber are the follows:
Effective area at 1550 nm: 64 μm$^2$,
Zero-dispersion wavelength: 1395 nm,
Dispersion at 1550 nm: 7.4 ps/nm·km,
Dispersion slope at 1550 nm: 0.043 ps/nm$^2$·km,
Cutoff wavelength: 1480 nm,
Attenuation at 1550 nm: 0.20 dB/km,
Maximum additional attenuation induced at 1550 nm and 1625 nm from macro bending for 100 turns on Φ 60 mm reel: 0.009 dB,
Maximum additional attenuation induced from bending at 1550 nm and 1625 nm from macro bending for 1 turn on Φ 32 mm reel: 0.014 dB.

The dispersion slope of the fiber in Embodiment 2 is less than 0.050 ps/nm$^2$·km at 1550 nm, its zero-dispersion wavelength is shifted out of S band, and it has excellent attenuation and bending performance, and its cutoff wavelength is lowered 200 to 400 nm after cabling. The requirement of dense wavelength division multiplex in the S+C+L bands can be fulfilled by such a fiber.

Embodiment 3

Figure 3:
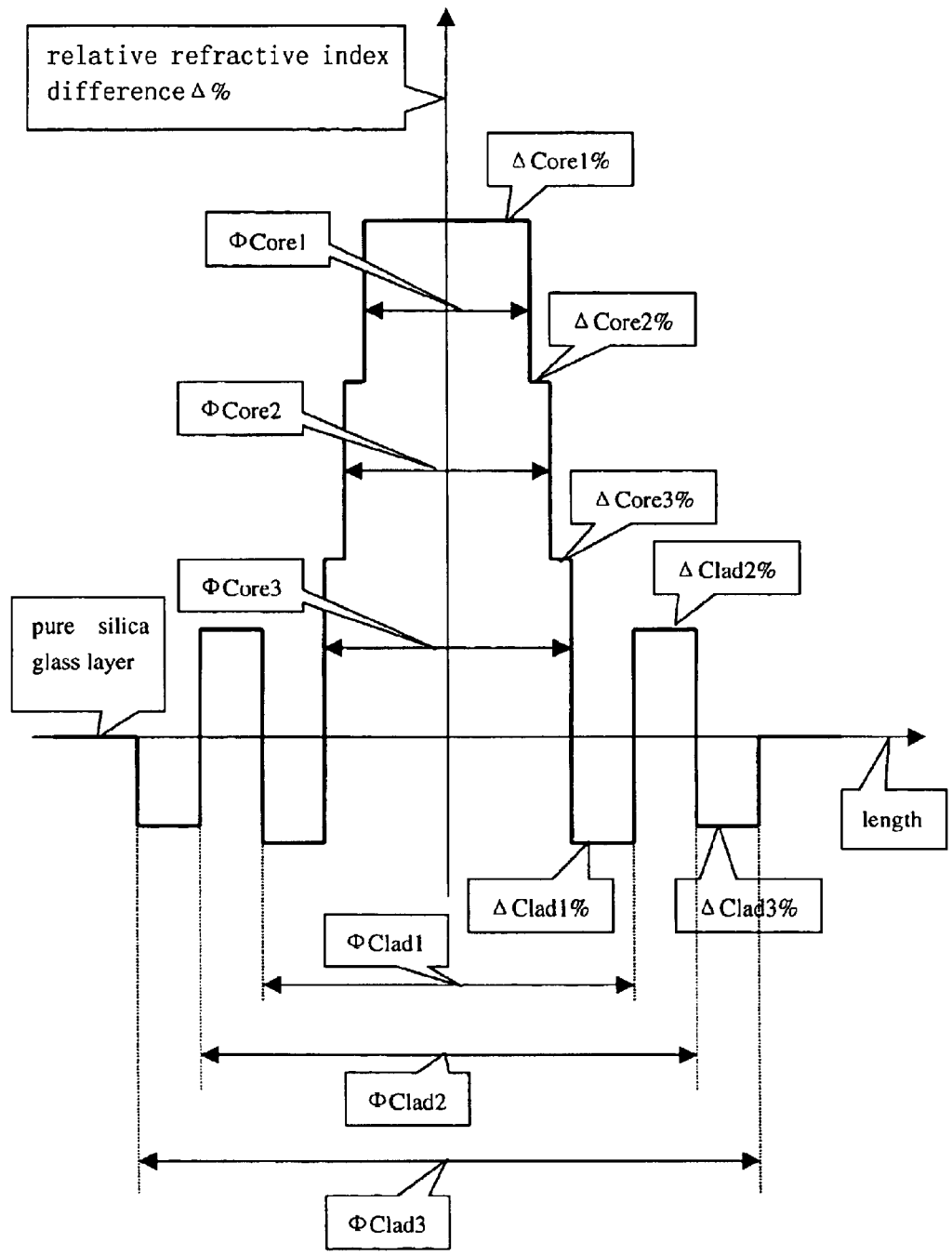
FIG. 3 is a distribution graph showing schematically the relative refractive index difference Δ% profile versus diameter in the third embodiment of the invention.

The fiber of Embodiment 3 has two negative relative refractive index differences in its cladding segments. The parameter set for said relative refractive index difference profiles shown in FIG. 3 are listed as follows:
The parameters of the respective core segments are:
First core segment Core1:
ΔCore1% is about 0.42, ΦCore1 is about 4.6 μm
Second core segment Core2:
ΔCore2% is about 0.35, ΦCore2 is about 6.0 μm
Third core segment Core3:
ΔCore3% is about 0.28, ΦCore3 is about 7.1 μm
The parameters of the respective cladding segments are:
First cladding segment Clad1:
ΔClad1% is about −0.08, ΦClad1 is about 12.5 μm
Second cladding segment Clad2:
ΔClad2% is about 0.18, ΦClad2 is about 18.1 μm
Third cladding segment Clad3:
ΔClad3% is about −0.08, ΦClad3 is about 29.0 μm
Fourth cladding segment is a pure silica glass layer.
The performances of the obtained fiber are the follows:
Effective area at 1550 nm: 61 μm$^2$,
Zero-dispersion wavelength: 1390 nm,
Dispersion at 1310 nm: −3.5 ps/nm·km,
Dispersion at 1550 nm: 8.3 ps/nm·km,
Dispersion slope at 1550 nm: 0.050 ps/nm$^2$·km,
Cutoff wavelength: 1180 nm,
Attenuation at 1310 nm: 0.34 dB/km,
Attenuation at 1550 nm: 0.19 dB/km,
Maximum additional attenuation induced at 1550 nm and 1625 nm from macro bending for 100 turns on Φ 60 mm reel: 0.005 dB,
Maximum additional attenuation induced from bending at 1550 nm and 1625 nm from macro bending for 1 turn on Φ 32 mm reel: 0.011 dB.

The dispersion slope of the fiber in Embodiment 3 is less than 0.055 ps/nm$^2$·km at 1550 nm, its zero-dispersion wavelength is shifted out of S band, and it has excellent attenuation and bending performance, and its cutoff wavelength is lowered 200 to 400 nm after cabling. The requirement of dense wavelength division multiplex in the S+C+L bands can be fulfilled by such a fiber. The smaller cutoff wavelength and the lower attenuation at 1310 nm make the traditional 1310 nm window can be used for single mode transmission. Thus a single mode transmission through 1310 nm window is realized over a non-zero dispersion-shifted fiber. In particular, because a depression structure is adopted in ΔClad3%, the cutoff wavelength is lowered and less than 1310 nm, so that single mode transmission through 1310 nm window may be performed simultaneously over the wide band non-zero dispersion-shifted fiber of the invention. Adopting the standard test method, under the test condition of winding 100 turns on Φ 60 mm reel, the additional attenuation induced by bending is less than 0.01 dB at both 1550 nm and 1625 nm, under the test condition of winding 1 turn on Φ 32 mm reel, the additional attenuation induced by bending is less than 0.02 dB.

It can be seen by comparison of the aforesaid three embodiments that the refractive index profile can greatly affect the waveguide performance. In particular, the refractive indices and diameters of the respective core segments can greatly affect the dispersion and effective area, i.e., the greater the relative index, the smaller the effective area. Because the segmenting core method is adopted in the design of the core of the invention, the effective area and the dispersion can be controlled precisely. The value of ΔClad1% can vary the dispersion slope of the fiber, i.e., the smaller the relative value, the smaller the dispersion slope of the fiber. Though the value of ΔClad3% can affect the effective area and the dispersion slope of the fiber, however, a depression structure is adopted in ΔClad3%, the cutoff wavelength is lowered greatly, so that the possibility of single mode transmission through 1310 nm window may be realized over a wide band non-zero dispersion-shifted fiber.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the methods and apparatus shown herein but is to be accorded the widest scope consistent with the claims set forth below.

What is claimed is:

1. A low dispersion slope dispersion-shifted single-mode fiber for large capacity transmission comprising a core and a cladding is characterized in that said core has three segments having different refractive index profiles, and said cladding has four cladding segments, wherein, the relative refractive index difference ΔCore1% of the first core segment of said core ranges from 0.35% to 0.48%, its diameter ΦCore1 ranges approximately from 2.0 $\mu$m to 7.0 $\mu$m; the relative refractive index difference ΔCore2% of the second core segment Core2 ranges approximately from 0.25% to 0.65%, and the diameter ΦCore2 ranges approximately from 3.0 $\mu$m to 8.0 $\mu$m; the relative refractive index difference ΔCore3% of the third core segment Core3 ranges approximately from 0.1% to 0.4%, and the diameter ΦCore3 ranges approximately from 4.0 $\mu$m to 10.0 $\mu$m; the relative refractive index difference ΔClad1% of the first cladding segment Clad1 ranges approximately from −0.2% to 0.1%, and the diameter ΦClad1 ranges approximately from 8.0 $\mu$m to 16.0 $\mu$m; the relative refractive index difference ΔClad2% of the second cladding segment Clad2 ranges approximately from 0.1% to 0.4%, and the diameter ΦClad2 ranges approximately from 12.0 $\mu$m to 25.0 $\mu$m; the relative refractive index difference ΔClad3% of the third cladding segment Clad3 ranges approximately from −0.2% to 0.2%, and the diameter ΦClad3 ranges approximately from 19.0 $\mu$m to 30.0 $\mu$m; the fourth cladding segment is a layer of pure silica glass, and its refractive index is the refractive index of the pure silica glass nc, the total dispersion slope of said fiber at 1550 nm is less than 0.060 ps/nm$^2$·km, the zero dispersion wavelength is less than 1420 nm, the effective area ranges from 55 $\mu$m$^2$ to 65 $\mu$m$^2$, and the dispersion in the region of 1530 nm~1565 nm ranges from 5.0 ps/nm·km to 12.0 ps/mn·km.

2. The low dispersion slope dispersion-shifted single-mode fiber according to claim 1, wherein the preferable waveguide structure of the fiber, both the relative refractive index difference ΔClad1% of said first cladding segment Clad1 and the relative refractive index difference ΔClad3% of said third cladding segment Clad3 are negative.

3. The low dispersion slope dispersion-shifted single-mode fiber according to claim 1, wherein the ranges of the parameters of the respective core segments and cladding segments are the follows:

the parameters of said first core segment Core1 are:
ΔCore1% is about 0.42±0.06,
ΦCore1 is about 4.6±0.7 $\mu$m;
the parameters of said second core segment Core2 are:
ΔCore2% is about 0.35±0.08,
ΦCore2 is about 6.0±1.0 $\mu$m;
the parameters of said third core segment Core3 are:
ΔCore3% is about 0.28±0.1,
ΦCore3 is about 7.1±1.5 $\mu$m;
the parameters of said first cladding segment Clad 1 are:
ΔClad1% is about −0.08±0.07,
ΦClad1 is about 12.5±2.0 $\mu$m;
the parameters of said second cladding segment Clad2 are:
ΔClad2% is about 0.18±0.07,
ΦClad2 is about 18.1±2.0 $\mu$m;
the parameters of said third cladding segment Clad3 are:
ΔClad3% is about −0.08±0.07,
ΦClad3 is about 27.0±2.5 $\mu$m.

4. The low dispersion slope dispersion-shifted single-mode fiber according to claim 3, wherein the parameters of the respective core segments are:

the parameters of the first core segment Core1 are:
ΔCore1% is about 0.42, ΦCore1 is about 4.6 $\mu$m;
the parameters of the second core segment Core2 are:
ΔCore2% is about 0.35, ΦCore2 is about 6.0 $\mu$m; and
the parameters of the third core segment Core3 are:
ΔCore3% is about 0.28, ΦCore3 is about 7.1 $\mu$m;
and wherein the parameters of the respective cladding segments are:
the parameters of the first cladding segment Clad 1:
ΔClad1% is about −0.10, Clad1 is about 11.5 $\mu$m;
the parameters of the second cladding segment Clad2:
ΔClad2% is about 0.18, ΦClad2 is about 16.2 $\mu$m; and
the parameters of the third cladding segment Clad3:
ΔClad3% is about 0.02, ΦClad3 is about 29.0 $\mu$m.

5. The low dispersion slope dispersion-shifted single-mode fiber according to claim 3, wherein the parameters of the respective core segments are:

the parameters of the first core segment Core1 are:
ΔCore1% is about 0.42, ΦCore1 is about 4.6 $\mu$m;
the parameters of the second core segment Core2 are:
ΔCore2% is about 0.35, ΦCore2 is about 6.0 $\mu$m; and
the parameters of the third core segment Core3 are:
ΔCore3% is about 0.28, ΦCore3 is about 7.1 $\mu$m;
and wherein the parameters of the respective cladding segments are:
the parameters of the first cladding segment Clad1 are:
ΔClad1% is about −0.08, ΦClad1 is about 12.5 $\mu$m;
the parameters of the second cladding segment Clad2 are:
ΔClad2% is about 0.18, ΦClad2 is about 18.1 $\mu$m; and
the parameters of the third cladding segment Clad3 are:

ΔClad3% is about −0.08, ΦClad3 is about 29.0 μm.

6. The low dispersion slope dispersion-shifted single-mode fiber according to claim 1, wherein the parameters of the respective core segments are:

the parameters of the first core segment Core1 are:
ΔCore1% is about 0.42, ΦCore1 is about 4.6 μm;
the parameters of the second core segment Core2 are:
ΔCore2% is about 0.35, ΦCore2 is about 6.0 μm; and
the parameters of the third core segment Core3 are:
ΔCore3% is about 0.28, ΦCore3 is about 7.1 μm;
and wherein the parameters of the respective cladding segments are:
the parameters of the first cladding segment Clad1:
ΔClad1% is about −0.10, ΦClad1 is about 11.5 μm;
the parameters of the second cladding segment Clad2 are:
ΔClad2% is about 0.18, ΦClad2 is about 16.2 μm; and
the parameters of the third cladding segment Clad3:
ΔClad3% is about 0.02, ΦClad3 is about 29.0 μm.

7. The low dispersion slope dispersion-shifted single-mode fiber according to claim 1, wherein the parameters of the respective core segments are:

the parameters of the first core segment Core1 are:
ΔCore1% is about 0.42, ΦCore1 is about 4.6 μm;
the parameters of the second core segment Core2 are:
ΔCore2% is about 0.35, ΦCore2 is about 6.0 μm; and
the parameters of the third core segment Core3 are:
ΔCore3% is about 0.28, ΦCore3 is about 7.1 μm;
and wherein the parameters of the respective cladding segments are:
the parameters of the first cladding segment Clad1 are:
ΔClad1% is about −0.08, ΦClad1 is about 12.5 μm;
the parameters of the second cladding segment Clad2 are:
ΔClad2% is about 0.18, ΦClad2 is about 18.1 μm; and
the parameters of the third cladding segment Clad3 are:
ΔClad3% is about −0.08, ΦClad3 is about 29.0 μm.

* * * * *